US006490931B1

(12) United States Patent
Fernald et al.

(10) Patent No.: US 6,490,931 B1
(45) Date of Patent: Dec. 10, 2002

(54) FUSED TENSION-BASED FIBER GRATING PRESSURE SENSOR

(75) Inventors: Mark R. Fernald, Enfield, CT (US); Timothy J. Bailey, Longmeadow, MA (US); Matthew B. Miller, East Hartford, CT (US); James M. Sullivan, Manchester, CT (US); James R. Dunphy, South Glastonbury, CT (US); Christopher J. Wright, Amston, CT (US); Martin A. Putnam, Cheshire, CT (US); Robert J. Maron, Cromwell, CT (US); Richard T. Jones, Hamden, CT (US); Guy A. Daigle, Plainville, CT (US); John J. Grunbeck, Northford, CT (US); Alan D. Kersey, South Glastonbury, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 09/399,403

(22) Filed: Sep. 20, 1999

Related U.S. Application Data (63) Continuation-in-part of application No. 09/205,941, filed on Dec. 4, 1998, now abandoned.

(51) Int. Cl.[7] ................................................. G01L 9/00
(52) U.S. Cl. ......................................................... 73/705
(58) Field of Search ..................... 73/705, 708, 729.1, 73/152.22, 152.27, 152.51, 800; 250/231.19, 227.14, 227.18, 227.21; 356/32, 34, 345, 349, 350, 352

(56) References Cited

U.S. PATENT DOCUMENTS

| | | | |
|---|---|---|---|
| 4,636,031 A | 1/1987 | Schmadel, Jr. et al. | 350/96.19 |
| 4,915,467 A | 4/1990 | Berkey | 350/96.15 |
| 5,007,705 A | 4/1991 | Morey et al. | 350/96.29 |

(List continued on next page.)

FOREIGN PATENT DOCUMENTS

| | | | |
|---|---|---|---|
| DE | 1 9648403 | 4/1998 | |
| EP | 0359351 | 9/1992 | ........... C03B/37/15 |

(List continued on next page.)

OTHER PUBLICATIONS

"Design of DFB fibre lasers", V. C. Lauridsen et al, Electron. Lett., vol. 34, No. 21, pp. 2028–2030, 1998 (No month).
"Erbium doped fibre DFB laser with permanent $\pi/2$ phase–shift induced by UV post–processing", P. Varming et al, IOOC '95, Tech. Digest, vol. 5, PD1–3, 1995 (No month).
M.G. Xu, . Geiger and J. P. Dakin for "Fibre grating pressure sensor with enhanced sensitivity using a glass–bubble housing"—Electronics Letters—18th Jan. 1996 vol. 32, No. 2.
Quartzdyne, Inc., Series QU/QG Spec Specification Sheet and p. 6, Section 1, General Information taken from Quartzdyne Pressure Transducers General Catalog and Operating Manual for Quartzdyne Downhole High Pressure Transducers (Series QU, QG, QL, TMC, 1XP and LP) Apr. 1, 1997.
"The Thickness–Shear Quartz Resonator: A Rugged, Precision Pressure Transducer" Product Feature from SENSORS, Jul. 1990.

*Primary Examiner*—William Oen
(74) *Attorney, Agent, or Firm*—Howrey, Simon, Arnold & White, LLP (57) ABSTRACT

A fused tension-based fiber grating pressure sensor includes an optical fiber having a Bragg grating impressed therein. The fiber is fused to tubes on opposite sides of the grating and an outer tube is fused to the tubes to form a chamber. The tubes and fiber may be made of glass. Light is incident on the grating and light is reflected from the grating at a reflection wavelength $\lambda_1$. The grating is initially placed in tension as the pressure P increases, the tension on the grating reduced and the reflection wavelength shifts accordingly. A temperature grating may be used to measure temperature and allow for a temperature-corrected pressure measurement.

86 Claims, 4 Drawing Sheets

U.S. PATENT DOCUMENTS

| | | |
|---|---|---|
| 5,042,898 A | 8/1991 | Morey et al. .................. 385/37 |
| 5,235,598 A | 8/1993 | Atkins et al. ................ 385/124 |
| 5,345,519 A | 9/1994 | Lu ............................... 385/12 |
| 5,367,589 A | 11/1994 | MacDonald et al. ........... 385/37 |
| 5,399,854 A | 3/1995 | Dunphy et al. ......... 250/227.17 |
| 5,469,520 A | 11/1995 | Morey et al. .................. 385/37 |
| 5,488,475 A * | 1/1996 | Friebele et al. .............. 356/352 |
| 5,511,083 A | 4/1996 | D'Amato et al. ............... 372/6 |
| 5,512,078 A | 4/1996 | Griffin ......................... 65/484 |
| 5,578,106 A | 11/1996 | Fleming, Jr. et al. ......... 65/391 |
| 5,594,819 A | 1/1997 | Narendran et al. ............ 385/12 |
| 5,682,453 A | 10/1997 | Daniel et al. .................. 385/99 |
| 5,684,297 A | 11/1997 | Cable .................... 250/227.14 |
| 5,691,999 A | 11/1997 | Ball et al. ..................... 373/20 |
| 5,745,626 A | 4/1998 | Duck et al. ................... 385/96 |
| 5,771,251 A | 6/1998 | Kringlebotn et al. .......... 372/6 |
| 5,841,131 A | 11/1998 | Schroeder et al. ..... 250/227.17 |
| 5,841,529 A * | 11/1998 | Sirkis ......................... 356/345 |
| 5,844,667 A | 12/1998 | Maron ....................... 356/35.5 |
| 5,844,927 A | 12/1998 | Kringlebotn et al. .......... 372/6 |
| 6,016,702 A * | 1/2000 | Maron ......................... 73/705 |

FOREIGN PATENT DOCUMENTS

| | | | |
|---|---|---|---|
| GB | 2 299203 | 9/1996 | |
| NO | 3 05004 | 6/1997 | |
| WO | WO 8204328 | 12/1982 | ........... G02B/5/172 |
| WO | WO 9932912 | 3/1998 | |
| WO | WO 9944026 | 2/1999 | |
| WO | WO 9932911 | 7/1999 | ............ G02B/6/16 |

\* cited by examiner

FUSED TENSION-BASED FIBER GRATING PRESSURE SENSOR

CROSS REFERENCE TO RELATED APPLICATIONS

This is a continuation-in-part of U.S. patent application Ser. No. 09/205,941, filed Dec. 4, 1998 now abandoned. U.S. patent applications Ser. No. 09/399,495, entitled "Tube-Encased Fiber Grating"; Ser. No. 09/400,364, entitled "Tube-Encased Strain-Isolated Fiber Grating Temperature Sensor"; Ser. No. 09/399,404, entitled "Tube-Encased Fiber Grating Pressure Sensor"; and U.S. Pat. No. 6,278,811, entitled "Fiber Optic Bragg Grating Pressure Sensor", all filed contemporaneously herewith, and Ser. No. 09/205,845, entitled "Method and Apparatus for Forming a Tube-Encased Bragg Grating", filed Dec. 4, 1998, all contain subject matter related to that disclosed herein.

FIELD OF THE INVENTION

This invention relates to fiber optic pressure sensors, and more particularly to a fused fiber grating pressure sensor.

BACKGROUND OF THE INVENTION

Sensors for the measurement of various physical parameters such as pressure and temperature often rely on the transmission of stain from an elastic structure (e.g., a diaphragm, bellows, etc.) to a sensing element. In a pressure sensor, the sensing element may be bonded to the elastic structure with a suitable adhesive.

It is also known that the attachment of the sensing element to the elastic structure can be a large source of error if the attachment is not highly stable. In the case of sensors which measure static, or very slowly changing parameters, the long term stability of the attachment to the structure is extremely important. A major source of such long term sensor instability is a phenomenon known as "creep," i.e., change in strain on the sensing element with no change in applied load on the elastic structure, which results in a DC shift or drift error in the sensor signal.

Certain types of fiber optic sensors for measuring static and/or quasi-static parameters require a highly stable, very low creep attachment of the optical fiber to the elastic structure. Various techniques exist for attaching the fiber to the structure to minimize creep, such as adhesives, bonds, epoxy, cements and/or solders. However, such attachment techniques may exhibit creep and/or hysteresis over time and/or high temperatures.

One example of a fiber optic based sensor is that described in U.S. Pat. No. 6,016,702 entitled "High Sensitivity Fiber Optic Pressure Sensor for Use in Harsh Environments" to Robert J. Maron, which is incorporated herein by reference in its entirety. In that case, an optical fiber is attached (by high temperature epoxy) to a compressible bellows at one location along the fiber and to a rigid structure at a second location along the fiber with a Bragg grating embedded within the fiber between these two attachment locations and in tension. As the bellows is compressed due to an external pressure change, the tension on the fiber grating is reduced, which changes the wavelength of light reflected by the grating. In that case, the attachment technique is an adhesive compound or bond, a mechanical attachment (shrink or press fit), or a welding or soldering of a metal coated fiber to a metallic rigid member. However, if the attachment of the fiber to the structure is not stable, the fiber may move (or creep) relative to the structure measurement inaccuracies.

In another example, a optical fiber Bragg grating pressure sensor secured in tension to a glass bubble by a UV cement is discussed in Xu, M. G., Beiger, H., Dakein, J. P., "Fibre Grating Pressure Sensor With Enhanced Sensitivity Using A Glass-Bubble Housing," Electronics Letters, 1996, Vol. 32, pp. 128–129.

However, as discussed hereinbefore, such attachment techniques may exhibit creep and/or hysteresis over time and/or high temperatures, or may be difficult or costly to manufacture.

SUMMARY OF THE INVENTION

Objects of the present invention include provision of a fiber optic pressure sensor with minimal creep.

According to the present invention, a pressure sensor is provided, comprising: an optical fiber, having at least one pressure reflective element embedded therein, the pressure reflective element having a pressure reflection wavelength; sensing means, fused to at least a portion of the fiber on opposite sides of the reflective element, for holding the fiber on opposite axial sides of the reflective element and for adjusting the strain on the fiber in response to external pressure; the reflective element having a predetermined amount of tension pre-strain; and the sensing means being strained due to a change in pressure, the strain causing a change in the pressure reflection wavelength, and the change in the pressure reflection wavelength being indicative of the change in pressure.

According further to the present invention, the sensing means comprises: a pair of end tubes being fused to at least a portion of the fiber on opposite sides of the reflective element; and an outer tube being fused to the end tubes. Additionally, the sensing means comprises a tube fused to at least a portion of the fiber on opposite axial sides of the reflective element. Further, according to the present invention, the reflective element is a Bragg grating.

The present invention provides an optical fiber and fiber grating put in tension within an all glass housing. The fiber is attached to the housing by fusing the fiber on opposite axial sides of the grating to the ends of the housing, thereby providing a creep resistant attachment of the fiber to the housing. Additionally, the outer walls (or cylinder or tube) of the housing are fused to the ends of the housing to provide an all glass enclosure which holds the optical fiber and grating in tension. In one further embodiment, pistons are used to provide a length amplification ΔL/L. Still further, an outer tube may be fused to the fiber on opposite axial ends of the grating area adjacent to or a predetermined distance from the grating.

One or more gratings, fiber lasers, or a plurality of fibers may be used to sense the pressure. The fiber may be fused within the tube or partially within or on the outer surface of the tube.

The present invention substantially eliminates creep and other fiber attachment problems. Further, the invention provides low hystersis. Also, more than one grating may be embedded in the fiber in the sensor. Further, the invention may be used as an individual sensor or as a plurality of distributed multiplexed sensors. Also, the invention may be a feed-through design or a non-feed-through design.

The invention may be used in harsh environments, such as in oil and/or gas wells, engines, combustion chambers, and the like. In one embodiment, the invention may be an all glass sensor capable of operating at high pressures (>15 kpsi) and high temperatures (>150° C.). The invention will also work equally well in other applications independent of the type of environment.

The foregoing and other objects, features, and advantages of the present invention will become more apparent in light of the following detailed description of exemplary embodiments thereof.

DESCRIPTION OF THE ILLUSTRATIVE EMBODIMENTS

Figure 1:
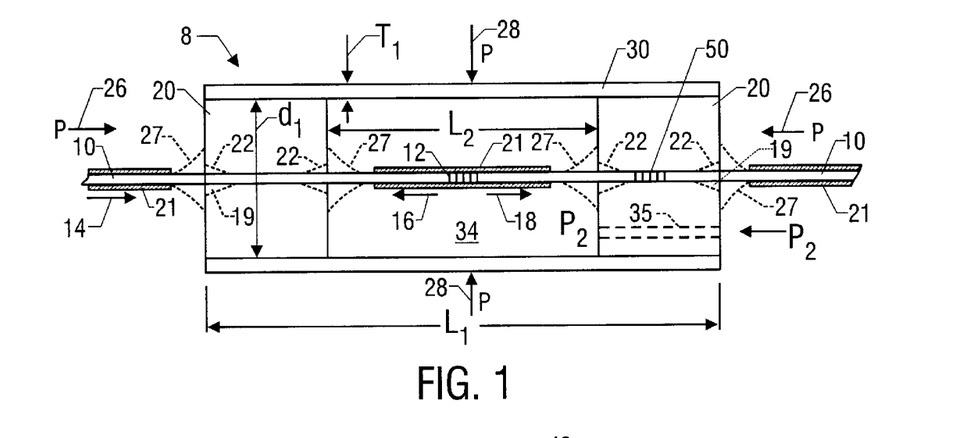
FIG. 1 is a side view of a fused fiber grating pressure sensor, in accordance with the present invention.

Referring to FIG. 1, fused tension-based fiber grating pressure sensor 8 comprises a known optical waveguide 10, e.g., a standard telecommunication single mode optical fiber, having a Bragg grating 12 impressed (or embedded or imprinted) in the fiber 10. The fiber 10 has an outer diameter of about 125 microns and comprises silica glass ($SiO_2$) having the appropriate dopants, as is known, to allow light 14 to propagate along the fiber 10. The grating 12 is similar to those described in U.S. Pat. Nos. 4,725,110 and 4,807,950, entitled "Method for Impressing Gratings Within Fiber Optics," to Glenn et al, and U.S. Pat. No. 5,388,173, entitled "Method and Apparatus for Forming Aperiodic Gratings in Optical Fibers," to Glenn, which are hereby incorporated by reference to the extent necessary to understand the present invention. However, any wavelength-tunable grating or reflective element embedded, etched, imprinted, or otherwise formed in the fiber 10 may be used if desired. As used herein, the term "grating" means any of such reflective elements. Further, the reflective element (or grating) 12 may be used in reflection and/or transmission of light.

Other materials and dimensions for the optical fiber or waveguide 10 may be used if desired. For example, the fiber 10 may be made of any glass, silica, phosphate glass, glass and plastic, plastic, or other materials used for making optical fibers. For high temperature applications, optical fiber made of a glass material is desirable. Also, the fiber 10 may have an outer diameter of 80 microns or other diameters. Further, instead of an optical fiber, any optical waveguide may be used, such as a multi-mode, birefringent, polarization maintaining, polarizing, multi-core, or multi-cladding optical waveguide, or a flat or planar waveguide (where the waveguide is rectangular shaped), or other waveguides. As used herein the term "fiber" includes the above-described waveguides.

The light 14 is incident on the grating 12 which reflects a portion thereof as indicated by a line 16 having a predetermined wavelength band of light centered at a reflection wavelength $\lambda_1$, and passes the remaining wavelengths of the incident light 14 (within a predetermined wavelength range), as indicated by a line 18.

The fiber 10 on opposite sides of the grating 12 is fused to at least a portion of two cylindrical glass capillary tube end caps 20 (or end tubes). The tubes 20 are surrounded by and fused to an outer cylinder or outer tube 30. The cylinder 30 forms a closed or hermetically sealed chamber (or cavity) 34 between the cylinder 30 and the tubes 20. The fiber 10 is strung between the two end caps 20 having an initial pre-strain in tension on the grating 12 (discussed more hereinafter). Instead of or in addition to the end tubes 20 being inside the outer tube 30, one or both of the tubes 20 may butt up against the tube 30 and be fused to an end face of the tubes 30.

The cylinder 30 acts similar to a diaphragm or bellows which compreses or deflects due to increased external pressure. In particular, as the pressure P increases, as indicated by the lines 26, the radial pressure 28 causes the cylinder 30 to deflect radially into the chamber 34 and the axial pressure 26 acting on the exterior axial end faces of the sections 20 and the cylinder 30 causes the cylinder 30 to axially compress. The amount of axial compression and radial deflection of the cylinder 30 will depend on its dimensions, geometry, and material properties (such as Poisson's ratio and Young's modulus (or axial compressibility) and other material properties). As the cylinder 30 compresses and/or deflects, the length $L_1$ decreases, and the initial tension pre-strain on the fiber 10 is reduced thereby shifting the reflection wavelength of the grating 12 in a similar fashion to that discussed in previously mentioned U.S. Pat. No. 6,016,702. As pressure P decreases, the elasticity of the walls 20 return the cavity length $L_1$ toward its original length, thereby causing the grating reflection wavelength to shift toward its original wavelength.

Some sample dimensions for the sensor 8 are as follows. The tubes 20 have an outer diameter $d_1$ of about 3mm. The grating 12 has a length of about 5 mm. The outer tube 30 has a thickness $T_1$ of about 0.5 mm (0.02 in). Other thicknesses may be used depending on the maximum pressure P and the desired compliance of the cylinder 30. The overall length $L_1$ of the fiber 10 and the end cap tubes 20 is about 10 cm (3.9 in) and the length $L_2$ of the fiber 10 between the tubes 20 is about 5.0 cm (2.0 in). Other dimensions and lengths for the tubes 20 and 30 and the grating 12 may be used. Also, the fiber 10 need not be fused in the center of the tube 20 but may be fused anywhere in the tube 20. Also, the tube 20 need not be fused to the fiber 10 over the entire length of the tube 20.

The tubes 20 and 30 are made of a glass material, such as natural or synthetic quartz, fused silica, silica ($SiO_2$), Pyrex® by Corning (borosilicate), or Vycor® by Corning (about 95% silica and 5% other constituents such as boron oxide), or other glasses. The tubes 20 and 30 should be made of a material such that the inner surface of the tube 20 (or the inner diameter surface of a bore hole in the tube 20 ) can be fused to (i.e., create a molecular bond with, or melt together with) the outer surface (or cladding) of the optical fiber 10 and the inner diameter of the tube 30 can be fused to the outer diameter of the tube 20, such that the interface surface between the inner diameter of the tubes 20 and the outer diameter of the fiber 10 and between the outer surface of the tubes 20 and the inner surface of the outer tube 30 become substantially eliminated. That is, the inner diameter of the tube 20 cannot be distinguished from and becomes part of the cladding of the fiber 10, and the outer diameter of the tubes 20 cannot be distinguished from and becomes part of the outer tube 30.

For the best thermal expansion matching of the tube 20 to the fiber 10 and of the outer tube 30 to the inner tube 20, over a large temperature range, the coefficient of thermal expansion (CTE) of the material of the tubes 20 and 30 should substantially match each other and substantially match the CTE of the material of the fiber 10. In general, the lower the melting temperature of the glass material, the higher the CTE. Thus, for a fiber 10 made of silica (having a high melting temperature and low CTE) and for tubes 20 made of another glass material, such as Pyrex® or Vycor® (having a lower melting temperature and higher CTE) a thermal expansion mismatch will occur. However, it is not required for the present invention that the CTE of the fiber 10, the inner tube 20 and the outer tube 30 to all match each other.

Instead of the tubes 20 and 30 being made of a glass material, other elastically deformable materials may be used provided that the inner tubes 20 can be fused to the fiber 10 and the outer tube 30 can be fused to the inner tube 20. For example, for an optical fiber made of plastic, tubes 20 and 30 made of a plastic material may be used.

Typical approximate values of Poisson's ratio, Young's Modulus and the Coefficient of Thermal Expansion (CTE) for certain glass materials for the tube 20 are provided in Table 1 below.

TABLE 1

| Material | Poisson's ratio | Young's Modulus | CTE |
| --- | --- | --- | --- |
| Natural Quartz | 0.16 | $10.5 \times 10^6$ psi | $5.5 \times 10^{-7}/°$ C. |
| Synthetic Quartz (Silica; Silicone Dioxide; $SiO_2$) | 0.16 | $10.5 \times 10^6$ psi | $5.5 \times 10^{-7}/°$ C. |
| Fused Silica | 0.16 | $10.5 \times 10^6$ psi | $5.5 \times 10^{-7}/°$ C. |
| Pyrex ® | 0.2 | $9.1 \times 10^6$ psi | $32.5 \times 10^{-7}/°$ C. |
| Vycor ® | 0.19 | $9.8 \times 10^6$ psi | $7.5 \times 10^{-7}/°$ C. |

To fuse the tubes 20 to the fiber 10, the tubes 20 may be heated by a laser, filament, flame, etc., as is described U.S. patent application Ser. No. 09/399,495, entitled "Tube-Encased Fiber Grating," filed contemporaneously herewith, and is incorporated herein by reference. Other techniques may be used for collapsing and fusing the tubes 20 to the fiber 10, such as is discussed in U.S. Pat. No. 5,745,626, entitled "Method For And Encapsulation Of An Optical Fiber," to Duck et al., and/or U.S. Pat. No. 4,915,467, entitled "Method of Making Fiber Coupler Having Integral Precision Connection Wells," to Berkey, which are incorporated herein by reference to the extent necessary to understand the present invention, or other techniques. Alternatively, other techniques may be used to fuse the fiber 10 to the tube 20, such as by using a high temperature glass solder, e.g., a silica solder (powder or solid), which allows the fiber 10, the tube 20, and the solder to become fused to each other, or by using laser welding/fusing or other fusing techniques. Also, the fiber may be fused within the tube or partially within or on the outer surface of the tube. Similar techniques may be used to fuse the outer tube 30 to the inner tube 20.

Numerous techniques may be used to create the initial tension pre-strain on the grating 12. For example, the 20 and 30 can be assembled with the fiber 10 under no pre-strain. Then the outer circumference of the outer tube 30 over the cavity 34 may be heated uniformly and stretched along the fiber's longitudinal axis until the desired pre-strain is achieved. The reflection wavelength of the grating 12 may be measured during the heating and stretching process. Alternatively, the tubes 20 may be first fused to the fiber 10 and then the tube 30 slid over the inner tubes 20 and fused to one of the tubes 20. Then, the fiber is pulled along its longitudinal axis until the desired pre-strain is achieved, and then the outer tube 30 is heated and fused to the other inner tube 20.

One or more of the axial ends of the tubes 20 where the fiber 10 exits the tubes 20 may have an inner region 22 which is inwardly tapered (or flared) away from the fiber 10 to provide strain relief for the fiber 10 or for other reasons. In that case, an area 19 between the tube 20 and the fiber 10 may be filled with a strain relief filler material, e.g., polyimide, silicone, or other materials.

The tubes 20 and 30 may have cross-sectional shapes other than circular, such as square, rectangular, elliptical, clam-shell, or other shapes, and may have side-view sectional shapes other than rectangular, such as circular, square, elliptical, clam-shell, or other shapes. Also, the tubes 20 and 30 may have various different geometries, depending on the application.

Alternatively, instead of having the inner tapered region 22, the axial ends of the tubes 20 where the fiber 10 exits the tubes 20 may have an outer tapered (or fluted, conical, or nipple) section, shown as dashed lines 27, which has an outer geometry that decreases down to the fiber 10 (discussed more hereinafter with FIG. 12). It has been determined that using the fluted sections 27 provides enhanced pull strength at and near the interface between the fiber 10 and the tube 20, e.g., 6 pounds of force (lbf) or more, when the fiber 10 is pulled along its longitudinal axis.

Where the fiber 10 exits the tubes 20, the fiber 10 may have an external protective buffer layer 21 to protect the outer surface of the fiber 10 from damage. The buffer 21 may be made of polyimide, silicone, Teflon® (polytetraflouroethylene), carbon, gold, and/or nickel, and can have a thickness of about 25 microns. Other thicknesses and buffer materials for the buffer layer 21 may be used. If an inner tapered axial region 22 is used and is large enough, the buffer layer 21 may be inserted into the region 22 to provide a transition from the bare fiber to a buffered fiber. Alternatively, if the region has the external taper 27, the buffer 21 would begin where the fiber exits the tubes 20. If the buffer 21 starts after the fiber exit point, the fiber 10 may be recoated with an additional buffer layer (not shown) which covers any bare fiber outside of the fused region and overlaps with the buffer 21 and may also overlap some of the region 27 or the end of the tubes 20.

The fiber 10 between the end cap tubes 20 may also be coated (or plated) with the buffer layer 21 to reduce stresses or enhance the strength of the fiber 10. The buffer layer 21 material may be the same material or a different material composition from that used for the external buffer layer 21 on the fiber outside the sensor 8.

Alternatively, to make a pressure differential sensor, a pressure port 35 may be provided through one or both of the end tubes 20 to port a second pressure $P_2$ into the inner chamber 34.

An additional grating 50 may be located in the fiber 10 and fused to one or both of the tubes 20 (in thermal proximity to the grating 12) to measure the temperature of the grating 12, such as is discussed in U.S. patent application Ser. No. 09/399,404 entitled "Tube-Encased Fiber Grating Pressure Sensor," which is incorporated herein by reference to the extent necessary to understand the present invention (discussed more hereinafter). In that case, the grating 50 would have a different reflection wavelength than that of the pressure grating 12.

The fluted sections 27 where the fiber 10 attaches to the tubes 20 may be formed in various ways, such as is described in U.S. patent application Ser. No. 09/399,495, entitled "Tube-Encased Fiber Grating," filed contemporaneously herewith, which is incorporated herein by reference to the extent necessary to understand the present invention. For example, the tube 20 may be heated and the tube 20 and/or the fiber 10 pulled on an end to form the fluted sections 27. Alternatively, the fluted ends 27 may be formed using other glass formation techniques, such as by etching, polishing, grinding, etc. Other techniques may be used to form the sections 27.

the inner region 22 may be created by numerous techniques, such as is described in the aforementioned U.S. patent application Ser. No. 09/399,495. For example, to create a region 22 that is larger than the inner diameter of the tube 20, the tube 20 may be heated in the desired region to expand it while applying internal pressure to the tube 20.

Figure 2:
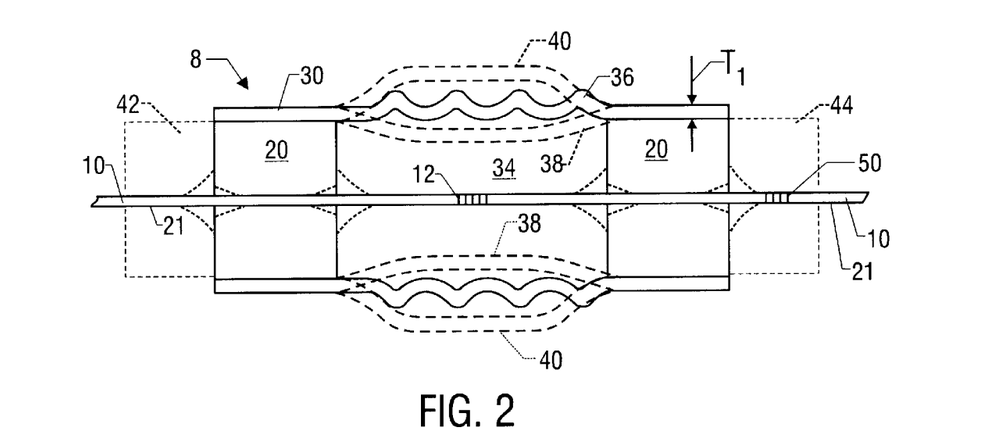
FIG. 2 is a side view of an alternative embodiment of a fused fiber grating pressure sensor, in accordance with the present invention.

Referring to FIG. 2, alternatively, the geometry of the outer cylinder 30 may be other than a straight cylinder. In particular, the geometry of the tube 30 is set based on the desired compliance of the cylinder 30. For example, the outer cylinder 30 may have a corrugated (or bellows) shape, as indicated by lines 36, or can have a pre-established inward or outward curvature as indicated by dashed lines 38, 40, respectively, or other geometries. The bellows shape of the cylinder 30 allows the axial compliance to increase while not reducing wall thickness $T_1$ and thus not reducing the maximum radial break strength pressure of the cylinder. Also, one or both of the tubes 20 may have axially extended sections 42 and 44 that extend beyond the length of the outer tube 30.

Figure 3:
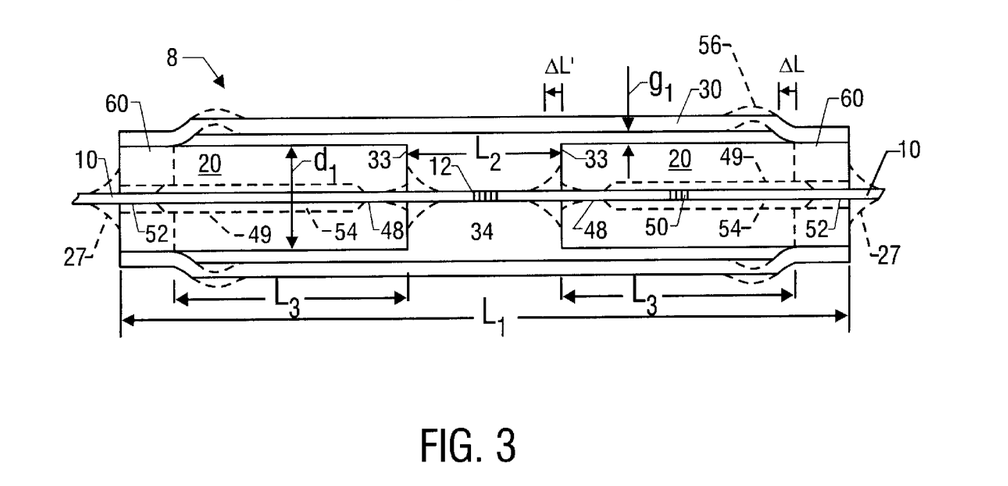
FIG. 3 is a side view of an alternative embodiment of a fused fiber grating pressure sensor, in accordance with the present invention.

Referring to FIG. 3, alternatively, the outer tube 30 may be fused to the inner end cap tubes 20 away from inner transition regions 33 and/or near the axial ends 60 of the tubes 20 (or pistons). Also, in that case, the chamber 34 would be an I-shaped (or rotated H-shaped) chamber. Further, there may be a bump 56 near where the outer tube 30 fuses to the inner tube 20. Alternatively, the pistons 20 may have unequal lengths or there may be only one piston 20 having the length of the two pistons ($2* L_3$) on one side of the grating 12 and the end cap 60 on the other side.

In that case, there would be a gap $g_1$ of about 0.5 mm (0.02 in.) between the inner diameter of the cylinder 30 and the outer diameter of the tubes 20. Further, the length of the outer tube 30 between where the outer tube 30 is fused to the pistons 20 ($2*L_3+L_2$) is about 3.5 cm (1.4 in).

Other values for the gap, thickness, and the lengths may be used if desired depending on the desired range, resolution, sensitivity, and or other design requirements. The resolution and range for sensing pressure P are scalable by controlling these parameters. For example, there are various ways to increase the sensitivity (psi/pm), such as decreasing the wall thickness $T_1$ (while withstanding the required maximum external pressure), increasing the gap $g_1$, increase the overall length $L_1$ between where the outer tube 30 is fused to the pistons 32 (e.g., increasing the length of the outer tube 30 and the piston 20 length $L_3$), or increasing the diameter $d_1$ of the pistons 20.

Also, such a configuration allows for the sensitivity (or resolution) to be scaled by changing the overall length $L_1$ (i.e., the lengths $L_3$ of the pistons 20 and outer tube 30). In particular (for a given length of the pistons 20 and the tube 30), for a change $\Delta L$ in length $L_1$ due to a pressure change, all of the change $\Delta L$ occurs across the length $L_2$ of the fiber 10 where the grating 12 is located. Then, if the length of the pistons 20 and the tube 30 are increased, the tube 30 will compress or deflect more (i.e., a larger $\Delta L$) for the same pressure change (because the amount of compression for a given force scales with length). This increased $\Delta L$ is seen across the same length $L_2$, thereby increasing the sensitivity $\Delta L/L_2$.

The fiber 10 maybe fused to the tubes (or pistons) 20 along the entire length thereof or the fiber 10 may be fused over a predetermined smaller region 48. In the later case, the fiber 10 exits through a bore hole 49 through the tubes 20.

Alternatively, the tube 20 may be fused to the fiber at two ends as indicated by the regions 48,52.

Also, a region 54 between the fused regions 48,52, and between the fiber 10 and the inner dimension of the hole 49 may be filled with a liquid or solid material, e.g., silicone gel, that further protects the fiber 10 and/or is thermally conductive to allow a temperature grating 50 (discussed hereinafter) to quickly sense changes in the temperature of the pressure grating 12, or for other uses.

Figure 4:
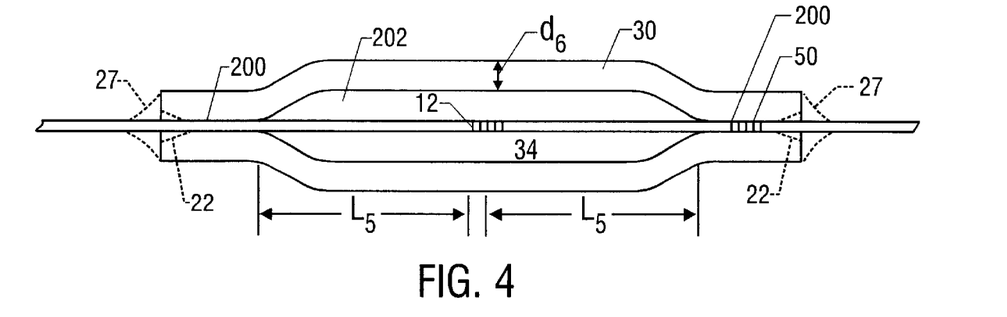
FIG. 4 is a side view of an alternative embodiment of a fused fiber grating sensor having a capillary tube fused to the fiber on opposite axial sides of a grating, in accordance with the present invention.

Referring to FIG. 4, alternatively, the tube 30 may be fused directly to the fiber 10 on opposite axial ends of the grating 12 adjacent to or a predetermined distance $L_5$ from the grating 12, where $L_5$ can any desired length or at the edge of the grating 12 ($L_5$=zero). In particular, regions 200 of the tube 30 are fused to the fiber 10 and a central section 202 of the tube 30 around the grating 12 is not fused to the fiber 10. The region 202 around the grating 12 forms the chamber 34. The inner diameter $d_6$ of the tube 30 may be any desired diameter. Also, the distance $L_5$ need not be symmetric around both sides of the grating 12.

Alternatively, the same result can be achieved by fusing two separate tubes on opposite sides of the grating 12 and then fusing an outer tube across the tubes, as discussed in the previously mentioned 09/399,495 patent application.

Figure 5:
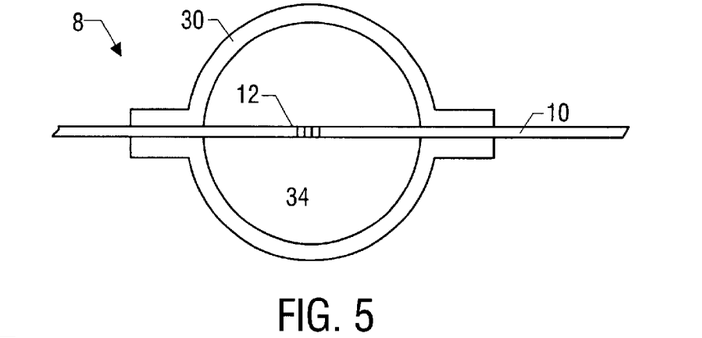
FIG. 5 is a side view of a fused fiber grating sensor having an outer tube with a circular shape, in accordance with the present invention.

Referring to FIG. 5, alternatively, the outer tube 30 may have a circular shaped side cross-sectional shape. In that case, the tube 30 may be a sphere (or bubble), or other closed three-dimensional shapes having a circular side view cross-section.

Figure 6:
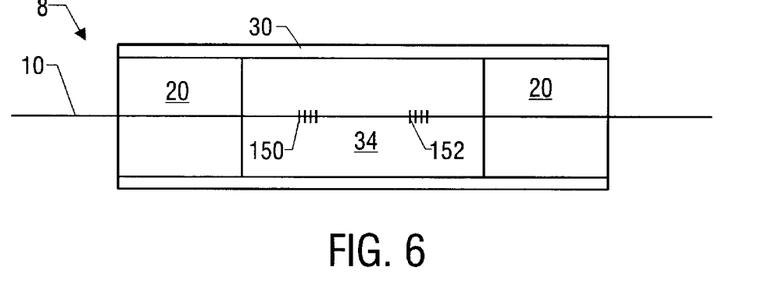
FIG. 6 is a side view of a fused fiber grating sensor having more than one grating in a fiber, in accordance with the present invention.

Referring to FIG. 6, for any of the embodiments described herein, instead of a single grating in the fiber 10, two or more gratings such as 150 and 152 may be embedded in the fiber 10. The gratings 150 and 152 may have the same reflection wavelengths and/or profiles or different wavelengths and/or profiles. The multiple gratings 150 and 152 may be used individually in a known Fabry Perot arrangement. Further, one or more fiber lasers, such as that described in U.S. Pat. No. 5,513,913, entitled "Active Multipoint Fiber Laser Sensor," U.S. Pat. No. 5,564,832, entitled "Birefringent Active Fiber Laser Sensor," or U.S. Pat. No. 5,666,372, entitled "Compression Tuned Fiber Laser," may be embedded within the fiber 10, which are incorporated herein by reference to the extent necessary to understand the present invention. In this embodiment, the gratings 150 and 152 form an optical cavity and the fiber 10 at least between the gratings 150 and 152 (and possibly also within and outside the gratings) would be doped with a rare earth dopant, e.g., erbium and/or ytterbium, etc., to cause the lasing wavelength to shift as pressure on the sensor 8 changes.

Figure 13:
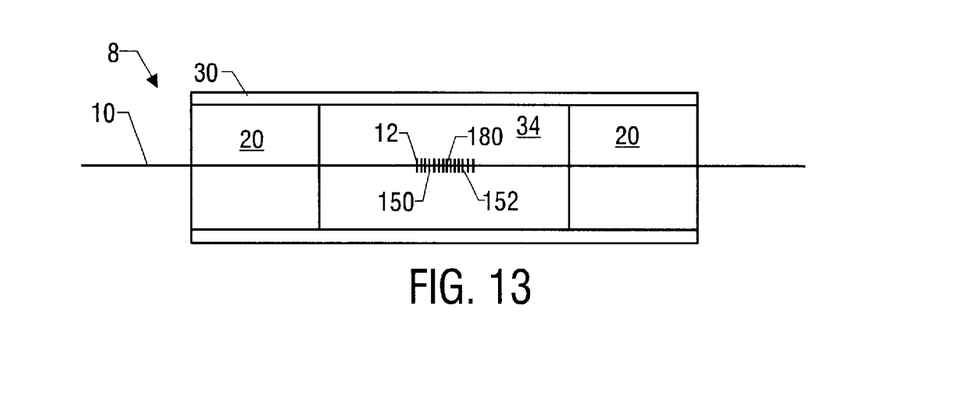
FIG. 13 is a side view of a fused fiber grating sensor having a DFB laser in a fiber in a chamber, in accordance with the present invention.

Referring to FIG. 13, another type of tunable fiber laser that may be used is a tunable distributed feedback (DFB) fiber laser, such as that described in V.C. Lauridsen et al, "Design of DFB Fibre Lasers," Electronic Letters, Oct. 15, 1998, Vol. 34, No. 21, pp. 2028–2030; P. Varming et al, "Erbium Doped Fiber DGB Laser With Permanent $\lambda/2$ Phase-Shift Induced by UV Post-Processing," IOOC'95, Tech. Digest, Vol. 5, PD1-3, 1995; U.S. Pat. No. 5,771,251, "Optical Fibre Distributed Feedback Laser," to Kringlebotn et al; or U.S. Pat. No. 5,511,083, "Polarized Fiber Laser Source," to D'Amato et al. In this embodiment, the grating 12 is written in a rare-earth doped fiber and configured to have a phase shift of $\lambda/2$ (where $\lambda$ is the lasing wavelength) at a predetermined location 180 near the center of the grating 12 which provides a well defined resonance condition that may be continuously tuned in single longitudinal mode operation without mode hopping, as is known. Alternatively, instead of a single grating, the two gratings 150 and 152 may be placed close enough to form a cavity having a length of $(N+\frac{1}{2})\lambda$, where N is an integer (including 0) and the gratings 150 and 154 are in a rare-earth doped fiber.

Figure 7:
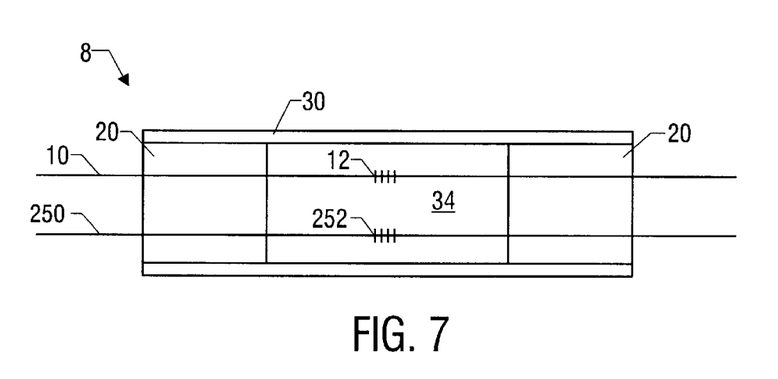
FIG. 7 is a side view of a fused fiber grating sensor having two separate optical fibers in a common chamber, in accordance with the present invention.

Referring to FIG. 7, alternatively, two or more fibers such as 10 and 250, and each having at least one grating 12 or 252 therein, respectively, may be located or fused between the tubes 20. Also, the bore hole for the tubes 20 and the fibers 10 and 250 need not be centered along the center line of the tubes 20. The fibers 10 and 250 may touch each other or they may be spaced apart in the tubes 20 by a predetermined distance. If they touch each other or are in close proximity to each other, the bore hole in the tubes 20 prior to heating and fusing may be other than circular, e.g., square, triangle, and the like, to fit more than one optical fiber. If the fibers 10 and 250 are separated, the distance between these fibers 10 and 250 may be any desired distance.

Referring to FIGS. 1, 2, 3, 4, and 8 the reflection wavelength of the grating 12 changes with temperature ($\Delta\lambda/\Delta T$), as is known. Also, the strain on the grating 12 may change over temperature due to a thermal mismatch between the inner tube 20 and the fiber 10. Furthermore, the strain on the fiber 10 and grating 12 may change over temperature due to the expansion or contraction of the outer tube 30 over temperature. To compensate for these effects, a separate temperature grating 50 may be used to measure temperature to correct for temperature-induced shifts in the reflection wavelength $\lambda_1$ of the pressure grating 12. The temperature grating 50 has a reflection wavelength $\lambda_3$ that changes with temperature but does not change due to a change in the pressure P. This is achieved by locating the temperature grating 50 in thermal proximity to the pressure grating 12 outside the pressure-strained region of the tube 20 and otherwise isolated from the pressure being measured. For example, in FIG. 3, the temperature grating 50 may be located in the fiber 10 between fused regions 48 and 52.

Referring to FIG. 2, alternatively, the temperature grating 50 may be located in the fiber 10 portion that is encased or fused in the axially protruding section 44 of the glass tube 20, outside the region that is surrounded by the outer tube 30. Alternatively, the temperature grating 50 may be in a separate optical fiber (not shown) located near or in the sensor 8 and may be optically coupled to the fiber 10 or separate from the fiber 10. Further, the temperature grating 50 may be a strain-isolated temperature sensor in a separate tube (not shown), such as that described in U.S. patent application Ser. No. 09/400,364 entitled, "Tube-Encased Strain-Isolated Fiber Grating Temperature Sensor."

Figure 8:
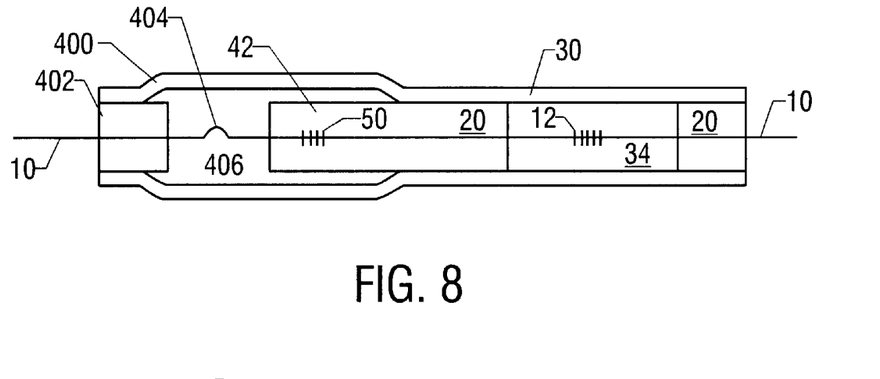
FIG. 8 is a side view of a fused fiber grating sensor with a pressure-isolated temperature grating, in accordance with the present invention.

Referring to FIG. 8, alternatively, the temperature grating 50 in the extended section 42 may be encased in a second outer tube 400 to form a pressure-isolated temperature sensor such as is discussed in U.S. patent application Ser. No. 09/205,942, entitled "Tube-Encased Pressure-Isolated Fiber Grating Temperature Sensor," which is incorporated herein by reference. In particular, the second tube 400 is fused to the section 42 and to the outer diameter of an end cap tube 402. The tube 402 may be made of the same material as the tube 20. The fiber 10 is fed through and fused to the inside of end tube 402 similar to the way the fiber 10 is fused to the tube 20. A chamber 406 exists between the section 42, the end tube 402, and the outer tube 400. Also, the fiber 10 has some slack 404 to allow the fiber 10 to flex. As the external pressure changes, the outer tube 400 compresses or deflects, the end cap 402 and/or the section 42 move toward each other, and the fiber 10 flexes in the chamber 406. However, the section 42 with the grating 50 is not exposed to the pressure change. Thus, the reflection wavelength of the temperature grating 50 does not change due to the pressure change. Further, the outer tube 30 and the second outer tube 400 may be one tube that is fused to the inner tubes 20 and 402. Other embodiments and configurations for the pressure-isolated temperature sensor may be used such as those described in the patent application 09/205,942. Also, for a non-feed through sensor, instead of the fiber 10 being fed through the chamber 406 and the end cap 402, the fiber 10 may end within the section 42 to the left of the temperature grating 50. Further, instead of the end cap 402, the tube 400 may be fused (and collapsed) onto itself to form the chamber 406.

For any of the embodiments shown herein, the temperature grating 50 may be encased in the tube 20 having an initial pre-strain on the grating 50 (compression or tension) or no pre-strain.

Referring to FIG. 2, alternatively, the temperature grating 50 may be located in a non-pressure-isolated area, such as in the tubes 20 or extended areas 42, 44 of the dogbone geometry. In that case, both the gratings 12 and 50 are subjected to pressure and temperature variations where the pressure-to-wavelength shift sensitivities for the gratings 12 and 50 are different. Thus, pressure and temperature can be analytically determined. Alternatively, if the change in wavelength with temperature is the same (or predictable) for both gratings 12 and 50, and the change in wavelength with pressure is different for the two gratings 12 and 50, then a temperature-compensated pressure measurement can be obtained analytically, e.g., by subtracting the two wavelengths. For example, the temperature grating 50 may be located in the region where the outer tube 30 is fused to the inner tube 20 (FIGS. 1, 4) or located in the axial extended section 42,44 (FIG. 2).

Alternatively, instead of using a fiber grating to measure the temperature of the pressure grating 12, any other technique may be used to determine the temperature of the pressure grating 12, e.g., electronic, thermocouple, optical, etc.

Figure 9:
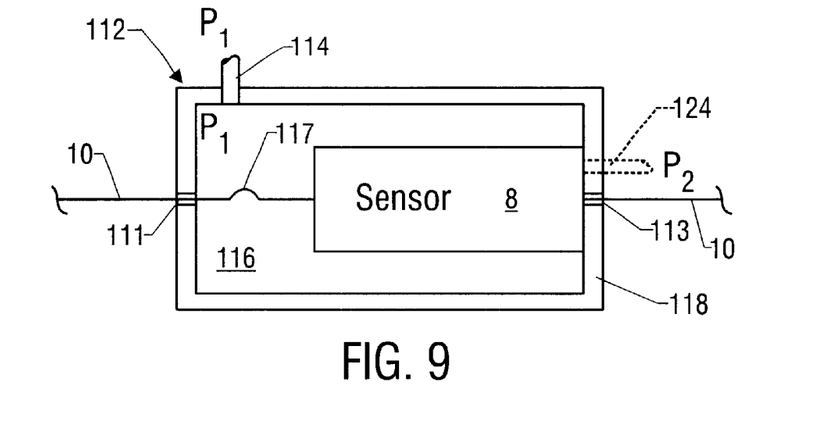
FIG. 9 is a side view of a tube-encased fiber grating sensor mounted to a wall of a housing, in accordance with the present invention.
Figure 10:
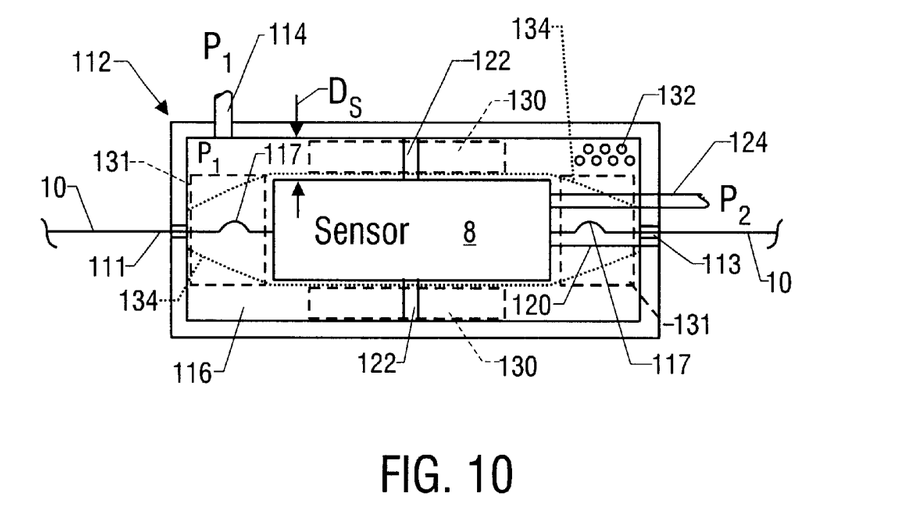
FIG. 10 is a side view of a tube-encased fiber grating sensor suspended within a housing, in accordance with the present invention.
Figure 11:
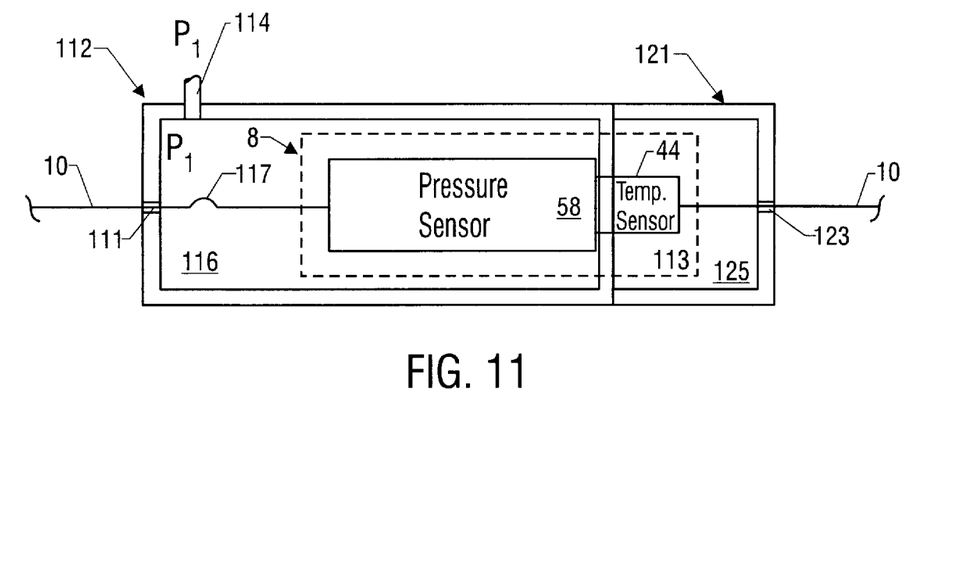
FIG. 11 is a tube-encased fiber grating sensor with a portion mounted inside a pressurized region of a housing and a portion of a tube located outside the pressurized region, in accordance with the present invention.

Referring to FIGS. 9–11, any of the sensor configurations 8 described herein may be placed within a housing 112 having a pressure port 114 which ports a pressure $P_1$ into a chamber 116 to expose the sensor 8 to the pressure $P_1$. The sensor 8 may be attached to at least one wall 118 of the housing 112 as shown in FIG. 9. Referring to FIG. 10, instead of attaching one side of the sensor 8 to a wall of the housing 112, the sensor 8 may be suspended within the housing 112 by supports 120 and 122 to one or more of the walls of the housing 112. The fiber 10 is fed through two hermetic feedthroughs 111 and 113. Also, the fiber 10 may have some slack 117 between the sensor 8 and the 111 and 113. Also, the sensor 8 may be a differential pressure sensor if a second pressure $P_2$ is ported to the sensor 8 as indicated by the lines 124.

Alternatively, instead of the supports 120 and 122, the sensor 8 may be suspended by the fluid in the chamber 116, e.g., a viscous fluid, grease, silicone oil, or other fluids that provide shock and/or vibration isolation and prevent the sensor 8 from hitting the inner walls of the housing 112. Instead of or in addition to using a fluid to suspend the sensor 8, compliant radial and/or axial spacers (or seats) 130 and 131, respectively, may be provided between the sensor 8 and the inner walls of the housing 112. The spacers 130 and 131 may be floating or attached to the inner housing walls. Also, small solid granular pellets or gel capsules (liquid contained in a small compliant membrane bubble) 132, may also be used. The spacers 130 and 131, or pellets/capsules 132 may be made of a compliant material such as Teflon®, polyimide, silicone, of other compliant materials. Alternatively, a fish net or sock-like lattice support 134 may be attached to opposite walls of the housing 112 on opposite axial sides of the sensor 8, which holds the sensor 8 between the inner walls of the housing 112 but which allows some motion of the sensor 8 and allows the pressure to be transferred to the sensor 8. Also, instead of the radial spacers 130, the radial space $D_s$ between the sensor 8 and the inner walls of the housing 112 may be small (e.g., about 3 mm), if desired, with a layer or film of fluid therebetween to act as a protective layer. Any other technique for suspending the sensor 8 within the housing 112 that provides shock and vibration isolation and allows pressure $P_1$ to be transferred to the sensor 8 may be used.

Referring to FIG. 11, alternatively, the sensor 8 may be partially inside and partially outside the pressurized chamber 116. In that case, the pressure exposed portion 58 of the sensor 8 would be exposed to the pressure $P_1$ and the axial extended portion 44 having the temperature grating 50 may be outside the chamber 116 and isolated from the pressure $P_1$. Also, in that case, there may be an optional additional portion 121 added to the housing 112 to protect the axial extended portion 44, which creates a chamber 125. The fiber 10 exits through a hermetic feedthrough 123 in the additional portion 121. Alternatively, the temperature grating 50 maybe exposed to the pressure $P_1$, as discussed hereinbefore.

Figure 12:
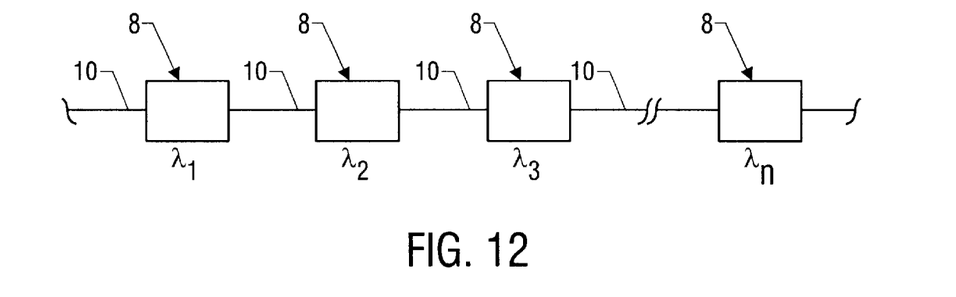
FIG. 12 is a side view of a plurality of fused fiber grating sensors connected in series by a common optical fiber, in accordance with the present invention.

Referring to FIG. 12, a plurality of the feedthrough pressure sensors 8 described herein, may be connected in series by a common optical fiber 10 to measure multiple points as distributed sensors. Any known multiplexing techniques may be used to distinguish one sensor signal from another sensor signal, such as wavelength division multiplexing (WDM) or time division multiplexing (TDM) or other multiplexing techniques. In that case, the characteristic or reflection wavelength of the grating (or gratings) in each sensor 8 may have one or more different reflection wavelength(s) (e.g., $\lambda_1$, $\lambda_2$, $\lambda_3$, $\lambda_n$).

Further, for any of the embodiments shown herein, instead of the fiber 10 passing through the sensor housing or the tube 20, the fiber 10 may be single-ended, i.e., only one end of the fiber 10 exits the housing or the tube 20. In that case, one end of the fiber 10 would be at the exit point of the fiber 10 from the tube 20 or prior to the exit point. Alternatively, the fiber 10 may exit from both sides of the tube 20 but one end of the fiber 10 would terminate before exiting the housing. Also, the term "tube" as used herein may also mean a block of material having the properties described herein.

Also, it should be understood that the gratings of the invention may be used in reflection and/or transmission depending on whether the reflected or transmitted light from the grating is used to measure the measurand.

Instead of the chamber or region 34 being filled with ambient air, they may be evacuated (or be at another pressure), or they may be partially or completely filled with a fluid (liquid or gas), e.g., an oil. The type of filling fluid will depend on the desired thermal time constant, viscosity, and other fluid properties based on the desired application.

It should be understood that the dimensions, geometries, and materials described for any of the embodiments herein, are merely for illustrative purposes and as such, any other dimensions, geometries, or materials may be used if desired, depending on the application, size, performance, manufacturing or design requirements, or other factors, in view of the teachings herein.

It should be understood that, unless otherwise stated herein, any of the features, characteristics, alternatives or modifications described regarding a particular embodiment herein may also be applied, used, or incorporated with any other embodiment described herein. Also, the drawings shown herein are not drawn to scale.

Although the invention has been described and illustrated with respect to exemplary embodiments thereof, the foregoing and various other additions and omissions may be made therein and thereto without departing from the spirit and scope of the present invention.

What is claimed is:

1. A pressure sensor, comprising:
   an optical fiber, having at least one pressure reflective element embedded therein, the pressure reflective element having a pressure reflection wavelength;
   sensing means, fused to at least a portion of the fiber on opposite sides of the reflective elements, for holding the fiber on opposite axial sides of the reflective element and for adjusting the strain on the fiber in response to external pressure;
   the reflective element having a predetermined amount of tension pre-stain; and
   the sensing means being strained due to a change in pressure, the strain causing a change in the pressure reflection wavelength, and the change in the pressure reflection wavelength being indicative of the change in pressure.

2. The pressure sensor of claim 1, wherein the sensing means comprises:
   a pair of end tubes being fused to at least a portion of the fiber on opposite sides of the reflective element; and
   an outer tube being fused to the end tubes.

3. The pressure sensor of claim 1, wherein the sensing means comprises a tube fused to at least a portion of the fiber on opposite axial sides of the reflective element.

4. The pressure sensor of claim 1, wherein the reflective element is a Bragg grating.

5. The pressure sensor of claim 3, wherein at least a portion of the tube has a cylindrical shape.

6. The apparatus of claim 1 wherein the sensing means is made of a glass material.

7. The apparatus of claim 1 wherein the sensing means has at least one axially extended region.

8. The apparatus of claim 1 wherein the sensing means has at least one outer tapered axial end.

9. The apparatus of claim 1 wherein the sensing means has at least one inner tapered axial end.

10. The apparatus of claim 1, wherein the sensing means comprises a plurality of optical fibers encased in the tube.

11. The apparatus of claim 1, wherein the fiber has a plurality of reflective elements embedded therein.

12. The apparatus of claim 1, wherein the fiber has at least one pair of reflective elements and the fiber is doped with a rare-earth dopant at least between the pair of elements to form a fiber laser.

13. The apparatus of claim 12, wherein the fiber laser lases at lasing wavelength which changes as pressure changes.

14. The apparatus of claim 1, wherein at least a portion of the fiber is doped with a rare-earth dopant where the reflective element is located and the reflective element is configured to form a DFB fiber laser.

15. The apparatus of claim 14, wherein the DFB fiber laser lases at a lasing wavelength which changes as force on the tube changes.

16. The apparatus of claim 1, wherein the fiber has a temperature reflective element embedded therein disposed in thermal proximity to the pressure reflective element which has a temperature reflection wavelength that changes with temperature.

17. The apparatus of claim 16, wherein the temperature reflective element is encased in the tube.

18. The apparatus of claim 16, wherein the temperature reflection wavelength does not change in response to a change in the pressure wavelength due to a change in the pressure.

19. The apparatus of claim 16, wherein the temperature reflection wavelength changes in response to a change in the pressure wavelength due to a change in the pressure at a different rate than the pressure wavelength changes due to a same change in pressure.

20. The apparatus of claim 1, further comprising an outer housing, which contains the sensing means, the sensing means being suspended in the housing by suspension means.

21. The apparatus of claim 18, wherein the suspension means comprises a fluid.

22. The apparatus of claim 18, wherein the suspension means comprises spacers in a fluid.

23. A pressure sensor, comprising:
    an optical fiber with at least one reflective element therein; and
    a sensing element fused to at least a portion of the fiber on opposite sides of the reflective element.

24. The sensor of claim 23, wherein the fiber and the sensing element are made of a glass material.

25. The sensor of claim 23, wherein the sensing element comprises a tube.

26. The sensor of claim 23, wherein the sensing element comprises a pair of end tubes and an outer tube.

27. A method of making a pressure sensor comprising the steps of:
    obtaining an optical fiber with at least one reflective element therein; and
    fusing a sensing element to at least a portion of the fiber on opposite sides of the reflective element.

28. The method of claim 27, wherein the fiber and the sensing element are made of a glass material.

29. The method of claim 27, wherein the sensing element comprises a tube.

30. The method of claim 27, wherein the sensing element comprises a pair of end tubes and an outer tube.

31. A pressure sensor, comprising:
    an optical waveguide comprising a pressure-sensitive reflective element; and
    a first housing fused to a cladding of the optical waveguide at first and second axial locations to form a cavity around the pressure-sensitive reflective element,
    wherein the optical waveguide is pre-tensioned within the cavity.

32. The sensor of claim 31, wherein the housing is cylindrical.

33. The sensor of claim 31, wherein the housing comprises a single tube.

34. The sensor of claim 31, wherein the housing comprises a first tube fused to the optical waveguide at the first axial location, a second tube fused to the optical waveguide at the second axial location.

35. The sensor of claim 34, wherein the housing further comprises a third tube affixed to the first and second tubes.

36. The sensor of claim 35, wherein the third tube is affixed to the outside surfaces of the first and second tubes.

37. The sensor of claim 35, wherein the third tube is fused to the first and second tubes.

38. The sensor of claim 31, wherein the housing is comprised of quartz.

39. The sensor of claim 31, wherein the reflective element comprises a Bragg grating.

40. The sensor of claim 31, wherein the support constitutes a unitary member.

41. The sensor of claim 31, further comprising a temperature-sensitive reflective element in the optical waveguide.

42. The sensor of claim 41, wherein the temperature-sensitive reflective element comprises a Bragg grating.

43. The sensor of claim 41, wherein the temperature-sensitive reflective element is not located proximate to the cavity.

44. The sensor of claim 41, wherein the temperature-sensitive reflective element is located proximate to the first or second axial locations.

45. The sensor of claim 31, wherein the cavity is hermetic.

46. The sensor of claim 31, further comprising a port coupling the cavity to an external environment.

47. The sensor of claim 31, wherein the cavity contains a fluid.

48. The sensor of claim 31, further comprising an additional optical waveguide.

49. The sensor of claim 31, wherein the optical waveguide comprises a plurality of reflective elements.

50. The sensor of claim 31, wherein the optical waveguide comprises at least one pair of reflective elements and is doped at least between the pair of elements to form a laser.

51. The sensor of claim 50, wherein the laser lases at a lasing wavelength which changes in response to pressure changes presented to the pressure-sensitive reflective element.

52. The sensor of claim 31, wherein at least a portion of the optical waveguide is doped and wherein the reflective element is configured to form a DFB fiber laser.

53. The sensor of claim 52, wherein the DFB fiber laser lases at lasing wavelength which changes in response to pressure changes presented to the pressure-sensitive reflective element.

54. The sensor of claim 31, further comprising a second housing which suspends the first housing through a suspension means.

55. The sensor of claim 54, wherein the suspension means comprises a fluid.

56. The sensor of claim 54, wherein the suspension means comprises spacers placed between the first and second housings.

57. A method for manufacturing a pressure sensor, comprising, in no particular order:

providing an optical waveguide comprising a pressure-sensitive reflective element; and fusing a first housing to a cladding of the optical waveguide at first and second axial locations to form a cavity around the pressure sensor; and pre-tensioning the optical waveguide within the cavity.

58. The method of claim 57, wherein the housing is cylindrical.

59. The method of claim 57, wherein the housing comprises a single tube.

60. The method of claim 57, wherein the housing comprises a first tube fused to the optical waveguide at the first axial location, a second tube fused to the optical waveguide at the second axial location.

61. The method of claim 60, wherein the housing further comprises a third tube affixed to the first and second tubes.

62. The method of claim 61, wherein the third tube is affixed to the outside surfaces of the first and second tubes.

63. The method of claim 61, wherein the third tube is fused to the first and second tubes.

64. The method of claim 57, wherein the housing is comprised of quartz.

65. The method of claim 57, wherein the reflective element comprises a Bragg grating.

66. The method of claim 57, wherein the support constitutes a unitary member.

67. The method of claim 57, further comprising a temperature-sensitive reflective element in the optical waveguide.

68. The method of claim 67, wherein the temperature-sensitive reflective element comprises a Bragg grating.

69. The method of claim 67, wherein the temperature-sensitive reflective element is not located proximate to the cavity.

70. The method of claim 67, wherein the temperature-sensitive reflective element is located proximate to the first or second axial locations.

71. The method of claim 57, wherein the cavity is hermetic.

72. The method of claim 57, further comprising coupling the cavity to an external environment.

73. The method of claim 57, further comprising placing a fluid within the cavity.

74. The method of claim 57, further comprising an additional optical waveguide.

75. The method of claim 57, wherein the optical waveguide comprises a plurality of reflective elements.

76. The method of claim 57, wherein the optical waveguide comprises at least one pair of reflective elements and is doped at least between the pair of elements to form a laser.

77. The method of claim 76, wherein the laser lases at a lasing wavelength which changes in response to pressure changes presented to the pressure-sensitive reflective element.

78. The method of claim 57, wherein at least a portion of the optical waveguide is doped and wherein the reflective element is configured to form a DFB fiber laser.

79. The method of claim 78, wherein the DFB fiber laser lases at a lasing wavelength which changes in response to pressure changes presented to the pressure-sensitive reflective element.

80. The method of claim 57, further comprising a second housing for suspending the first housing through a suspension means.

81. The method of claim 80, wherein the suspension means comprises a fluid.

82. The method of claim 80, wherein the suspension means comprises spacers placed between the first and second housings.

83. The method of claim 57, wherein pre-tensioning comprises heating the housing after it is fused to the cladding of the optical waveguide.

84. The method of claim 83, wherein pre-tensioning further comprises pulling the optical waveguide during the heating of the housing.

85. The method of claim 57, wherein pre-tensioning occurs before fusing the housing to the cladding of the optical waveguide.

86. The method of claim 85, wherein pre-tensioning further comprises pulling the optical waveguide as the housing is fused to the cladding of the optical waveguide.

* * * * *

UNITED STATES PATENT AND TRADEMARK OFFICE
CERTIFICATE OF CORRECTION

PATENT NO.   : 6,490,931 B1
DATED        : December 10, 2002
INVENTOR(S)  : Mark R. Fernald et al.

It is certified that error appears in the above-identified patent and that said Letters Patent is hereby corrected as shown below:

<u>Column 12,</u>
Line 51, please delete "elements" and insert -- element --

<u>Column 15,</u>
Line 5, please delete "at lasing" and insert -- at a lasing --

Signed and Sealed this

Eleventh Day of March, 2003

JAMES E. ROGAN
*Director of the United States Patent and Trademark Office*